(12) United States Patent
Olschok et al.

(10) Patent No.: US 10,702,811 B2
(45) Date of Patent: Jul. 7, 2020

(54) FILTER DEVICE FOR FLUIDS (71) Applicant: HYDAC PROCESS TECHNOLOGY GMBH, Neunkirchen (DE)

(72) Inventors: Markus Olschok, Neunkirchen (DE); Christian Schindler, Sulzbach (DE); Alexander Schwarzkopf, St. Wendel (DE)

(73) Assignee: HYDAC PROCESS TECHNOLOGY, Neunkirchen (DE)

( * ) Notice: Subject to any disclaimer, the term of this patent is extended or adjusted under 35 U.S.C. 154(b) by 0 days.

(21) Appl. No.: 16/301,914

(22) PCT Filed: May 24, 2017

(86) PCT No.: PCT/EP2017/000622
§ 371 (c)(1),
(2) Date: Nov. 15, 2018

(87) PCT Pub. No.: WO2017/207095
PCT Pub. Date: Dec. 7, 2017

(65) Prior Publication Data
US 2019/0262749 A1    Aug. 29, 2019

(30) Foreign Application Priority Data
May 28, 2016    (DE) ........................ 10 2016 006 509

(51) Int. Cl.
*B01D 35/06*    (2006.01)
*B01D 29/15*    (2006.01)
(Continued)

(52) U.S. Cl.
CPC ............. *B01D 35/06* (2013.01); *B01D 29/15* (2013.01); *B01D 29/21* (2013.01); *B01D 29/54* (2013.01); *B03C 1/286* (2013.01); *B03C 2201/18* (2013.01)

(58) Field of Classification Search
CPC . B03C 1/286; B03C 2201/18; B03C 2201/28; B01D 29/15; B01D 29/54
(Continued)

(56) References Cited

U.S. PATENT DOCUMENTS 2,580,012 A    12/1951    Gazda
5,174,892 A    12/1992    Davis
(Continued)

FOREIGN PATENT DOCUMENTS

DE    10 2006 062 807    5/2013
DE    10 2013 014 453    3/2015

OTHER PUBLICATIONS

International Search Report (ISR) dated Jul. 31, 2017 in International (PCT) Application No. PCT/EP2017/000622.

*Primary Examiner* — Claire A Norris
(74) *Attorney, Agent, or Firm* — Wenderoth, Lind & Ponack, L.L.P.

(57) ABSTRACT

A filter device for fluids includes a housing (1) accommodating a filter element (5). The housing has an inlet (47) for the supply of fluid to be purified to a non-filtrate chamber (49) of the housing (1) and has an outlet 42 for the filtrate. The non-filtrate chamber is separated from a filtrate chamber (46) of the housing (1) by the filter medium (33). A magnetic field-generator unit (57) is arranged inside the non-filtrate chamber (49). An adhering surface a sleeve or casing (51) attracts ferromagnetic particles by a magnetic force effect. In the non-filtrate chamber (49), the sleeve (51) extends outside of the respective filter element (5) parallel to the inlet (47) and transversely to the outlet (42). The non-filtrate chamber (49) at least partially encompasses the outlet (42) at the point of transition to the filtrate chamber (46).

14 Claims, 5 Drawing Sheets

(51) Int. Cl.
    *B03C 1/28*           (2006.01)
    *B01D 29/21*        (2006.01)
    *B01D 29/54*        (2006.01)

(58) Field of Classification Search
    USPC ................................................ 210/222, 695
    See application file for complete search history.

(56) References Cited

U.S. PATENT DOCUMENTS 8,636,907 B1 *   1/2014   Lin ........................ B03C 1/284
                                                                210/222
2016/0184746 A1    6/2016   Bautz et al.

* cited by examiner

FILTER DEVICE FOR FLUIDS

FIELD OF THE INVENTION

The invention concerns a filter device for fluids having a filter element and a magnetic field for attracting ferromagnetic particles against a surface of a sleeve.

BACKGROUND OF THE INVENTION

Pre-scalping of ferromagnetic contaminants from the fluid to be filtered using magnetic force is prior art for filter devices. Plant machinery that employs a fluid circuit for lubrication and/or cooling of mechanical equipment, such as transmissions or pumps, always have metal particles present in the fluid through friction during operation, in particular in the instance of transmissions that are under high load in heavy machinery such as wind turbines or cement mills. Ferromagnetic contamination of the fluid also occurs in other kinds of process fluids to a varying degree. In particular in detergent solutions often used in plants for the automatic manufacture of parts, a high concentration of ferromagnetic particles can be found in the fluid. The separation of particles significantly increases the service life of the filter elements, particularly in fluids with high contaminant concentrations.

DE 10 2006 062 807 B4 and DE 10 2013 014 453 A1 disclose examples of known devices. As a device that generates a magnetic field, these known filter devices use a magnetic rod with permanent magnets, also called a magnetic core. The magnetic core extends in those devices into the inner space of the respective filter element and is attached to a housing lid of the filter device. The outside of the magnetic rod forms the adhering surface on which the metallic particles are deposited in operation. In order to dispose of the deposits in the known device, the housing lid has to be unscrewed to be able to remove the magnetic rod together with the filter element from the housing. The magnetic rod must then be removed from the filter element to be able to remove the particles that adhere to the outside of the magnetic rod. The removal of these particles is rather difficult since they are retained by the magnetic force on the outside of the magnetic rod. The use of the known filter devices then requires a correspondingly large effort in terms of maintenance and time.

U.S. Pat. No. 8,636,907 B1 discloses a filter device of this kind for fluids, comprising a housing for at least one filter element. The housing has an inlet for supplying the fluid to be cleaned into an unfiltrate chamber of the housing. The unfiltrate chamber is separated by the filter medium of the filter element from a filtrate space of the housing. The filter space is provided with an outlet for filtrate. A magnetic field-generating device is disposed inside the unfiltrate chamber and provides an adhering surface for ferromagnetic particles that adhere thereto due to the magnetic force. At least one casing envelopes the associated magnetic field-generating device. The casing extends from at least one opening in the housing wall into the unfiltrate chamber and in which the respective magnetic field-generating device may be movably accommodated in such a way that it can be inserted into the casing and at least partially removed from it.

In the known solution, the respective casing of the magnetic field-generating device protrudes into the respective filter element itself or between the elements. On the one hand, it impairs the filtration of the unfiltrate supplied via the inlet. On the other hand, it makes it more difficult to remove the respective filter element and replace it with a new one.

SUMMARY OF THE INVENTION

Based upon the prior art, an object of the invention to provide an improved filter device of the kind described, which is characterised by an improved operating performance, in particular concerning filtration, and provides an easier way to operate the device.

According to the invention, this object is basically met by a filter device where the respective casing of the associated magnetic field-generating device or magnetic field generator extends outside the respective filter element in the unfiltrate chamber, parallel to the unfiltrate inlet and transverse to the filtrate outlet. The unfiltrate chamber surrounds at least partially the outlet at the transition point to the filtrate space. The magnetic field-generating device is separated from the filter element in the device housing. In this manner, neither the filtration process nor the change of a used filter element to a new filter element are impaired.

The magnetisable particles introduced via the unfiltrate inlet are already captured at the inlet point into the housing by the magnetic field-generating device before they reach the filter element. The particles then adhere to a casing that essentially surrounds the magnetic field-generating device. When removing the moveable, magnetic field-generating device, which in turn removes the magnetic force, the now no longer attracted particles drop away from the casing and can be easily removed from the unfiltrate chamber, for example through flushing out. The maintenance effort for removing and handling of the separated particles is then significantly reduced with the filter device according to the invention. The spatial separation of the particle removal function through the magnetic field-generating device and the other particle removal through the filter element inside the common device housing is also a contributing factor.

In a particularly preferred embodiment of the filter device according to the invention provision is made that the housing, at least in operation, extends along a vertical axis. The housing is comprised of at least two housing sections of which the lower housing section is provided with the inlet and the outlet, as well as the magnetic field-generating device. The other housing section serves to hold at least one filter element. This structure permits the lower housing section to preferably remain stationary with a stand on a floor. By removing the other housing section, the filter element can be made accessible for the replacement process. The remaining filter device remains as base on the floor as module on a stand, which makes assembly with the further modules easier. In a further preferred embodiment of the filter device according to the invention provision is made that the bottom of the lower housing section is closed and is provided with at least one openable outlet for particles. With a preferably closed filtrate outlet, the unfiltrate flowing in via the inlet flushes off the particles collected by the respective magnetic field-generating device from the device and/or cleans the lower housing section from contaminating particles. In this manner, it is possible to promptly discharge the magnetisable particles, captured through the respective magnetic field-generating device, via the openable and closable outlet at the bottom end of the lower housing section over the shortest possible path from the housing of the filter device.

In a particularly space-saving manner provision may be made that at both sides of the filtrate outlet and arranged at the same level are two parallel to each other oriented magnetic field-generating devices with their casings. These devices extend at least partially, preferably fully, through the lower housing section with its collecting chamber for magnetisable particles. This arrangement establishes homogenous magnetic fields in the vicinity of the inlet.

In particularly advantageous exemplary embodiments, the magnetic field-generating device is comprised of a magnetic rod formed through a group of permanent magnets. The magnetic rod is moveable inside a tubular casing and is accessible at one end of the tubular casing for handling purposes. While the magnetic field generated by permanent magnets constitutes a preferred exemplary embodiment, the respective casing may contain a removable device for generating an electromagnetic field.

The arrangement may advantageously be such that more than one tubular casing for a magnetic field-generating device, such as a magnetic rod, is provided. The casings may in this instance extend at a lateral or vertical distance from each other into the unfiltrate chamber or through the unfiltrate chamber.

In particularly advantageous exemplary embodiments provision is made that the lower housing section is provided with a bottom part that forms the bottom-end closure, the base of which forms the lower closing means of the unfiltrate chamber. The unfiltrate chamber extends along the outside of the filter medium of the respective filter element upwards, and is disposed in an axial distance from the base of the bottom part. At least one tubular casing extends in horizontal direction through the part of the unfiltrate chamber between the base of the bottom part and the filter element. The respective casing, which forms the adhering surface, is then disposed directly in the inflow section of unfiltrate into the housing, thereby causing a pre-scalping of particles before the unfiltrate rises with its non-magnetisable particle contamination to the filter element with its filter medium located above.

The arrangement may advantageously be such that on an element seat, which establishes the axial distance of the filter element from the base of the bottom part, a fluid connection is provided between the inner, hollow space of the filter element, which during the filtration process forms the filtrate chamber, and an outlet line for filtrate as part of the outlet. A tubular casing each extends through the unfiltrate chamber on both sides of the outlet line at a distance from the base of the bottom part.

The outlet line may preferably extend coaxial to the vertical axis from the element seat to the filtrate outlet or filtrate discharge located at the base of the bottom part. Besides the filtrate outlet, an additional outlet is provided on the base of the bottom part for the ferromagnetic particles that have dropped from the respective casing. The additional outlet may be provided with a shut-off that opens up the outlet for the purpose of flushing out the particles when required.

Alternatively, the arrangement may be such that the outlet line extends from the element seat to the filtrate outlet located on the side wall of the housing. At the base of the bottom part, coaxial to the vertical axis, the outlet for the ferromagnetic particles, which have dropped from the respective casing, is provided.

In particularly advantageous exemplary embodiments, casings are provided in form of tubes that extend from one housing side wall to another housing side wall. The tubes are preferably closed at one end and provide at the other end access for a moveable magnetic rod.

In their inserted state the magnetic rods may extend up to a closed end of the tube, and may be provided with an end section in form of a handhold at another end of the tube. The protruding section may be provided with a handhold for manual operation.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 2:
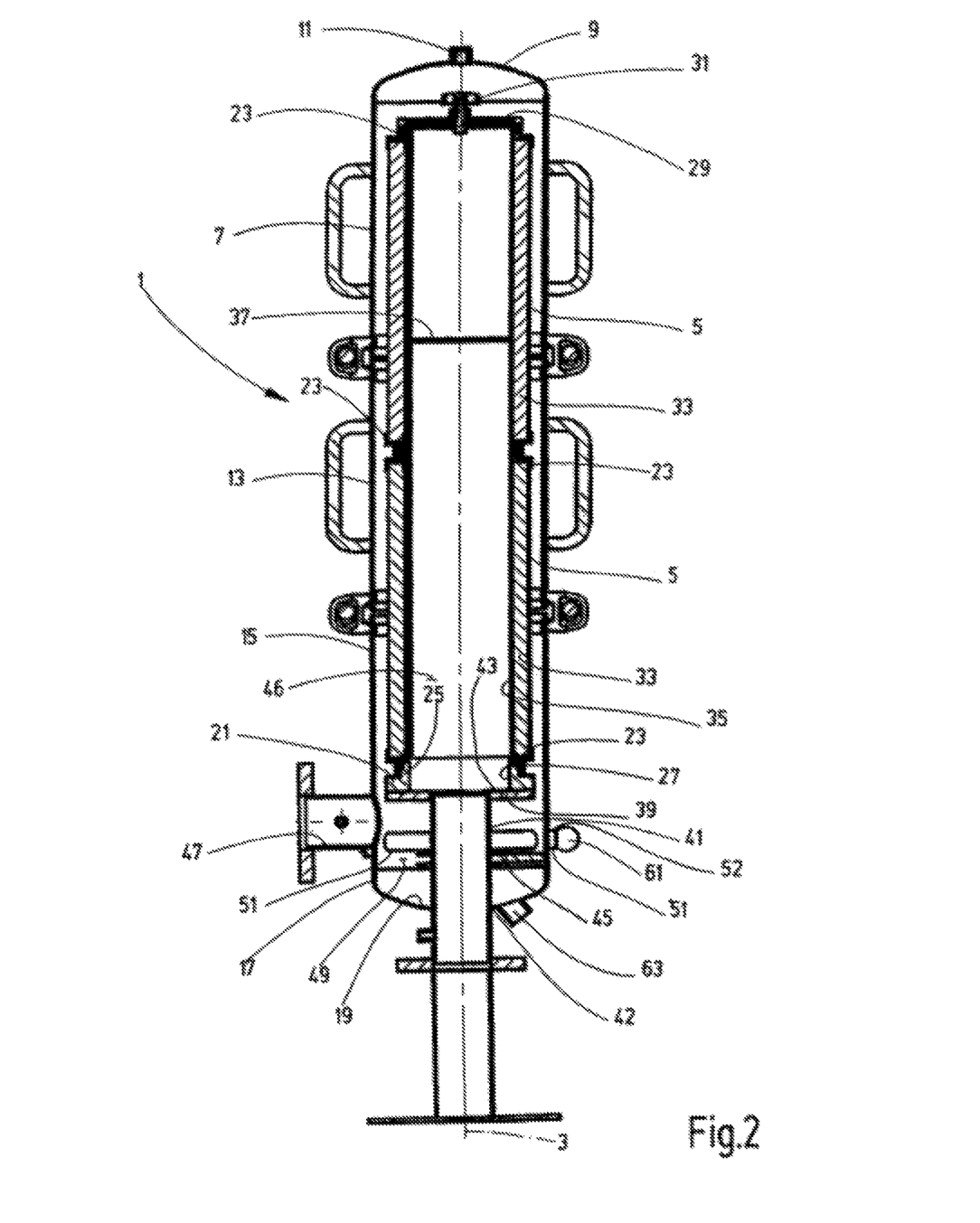
FIG. 2 is a schematically simplified, side view in section of the first exemplary embodiment in FIG. 1.

The invention is described by way of exemplary embodiments with reference to the attached drawings. In a circular-cylindrical filter housing 1, which extends along a vertical axis 3 (FIG. 2), a filter cartridge may be housed. In the examples shown, the filter cartridge is formed by two filter elements 5 of equal design. The housing 1 is formed by three housing sections that are screwed together. The top housing section 7 is closed off through an upper end section 9, which is provided with a centrally located, closable vent opening 11. Following the upper housing section 7 is a central, tubular housing section 13, followed by a lower housing section 15. This lower housing section 15 merges into a bottom part 17 that forms the lower housing end. The base 19 of the bottom part 17 has a slightly outwardly-domed bottom area.

To support the filter cartridge, which is made up of the filter elements 5, an element seat 21 is provided in form of an annular member. The annular member is provided with a socket-shaped, axially and upwardly protruding projection 25 that serves as connector for the lower filter element 5 and as seat for its end cap 23 that faces it. The projection 25 surrounds a central opening 27 of the element seat 21. The projection 25 that forms the connector is provided on the radially outer side with a bevelled surface that rests against a complementary bevelled surface that protrudes from the end cap 23 of the filter element 5. The remaining end caps 23 of the filter elements 5 are also provided with the complementary protruding bevelled surfaces, through which the lower filter element 5 and the upper filter element 5 are also attached to each other. A sealing ring is disposed between each of the matching bevelled surfaces, which are not visible in the drawing. A cover 29 is provided as upper end cover for the filter cartridge, which upper end cover cups the projection 25 of end cap 23 of the upper filter element 5. The cover 29 is provided with a centrally located vent 31.

As is common practice with such filter arrangements, a fluid-permeable supporting tube 35 is in contact with the inside of the filter medium 33 of the filter elements 5. Tube 35 extends all the way from the end cap 23 located on the element seat 21 to the upper end cap 23 of the upper filter element 5 and is strengthened in the upper section through a reinforcement ring 37. The annular member of the element seat 21 is retained on a supporting plate 39, which in turn is attached to the housing by a coaxially extending tube 41. Beginning from the central opening 43 of the supporting plate 39, the tube 41 forms the outlet through which the filtrate flows out from the inner filter cavity 46 forming the filtrate chamber of the filter cartridge during the filtration process and is discharged via a filter outlet 42. The tube 41 as part of the filter outlet 42 is supported via radially extending webs 45 on the inner housing wall of the lower housing section 15. Webs 45 extend in radial direction at the transition from the lower housing section 15 to the bottom part 17.

The tube 41 exits the housing 1 at the base 19 of the bottom part 17 coaxial to axis 3. An inlet 47 is provided in the section between the webs 45 and the supporting plate 39 of the element seat 21 in the side wall of the housing for the supply of unfiltrate to the part of the unfiltrate chamber 49 that follows inlet 47. Inlet 47 is inside the lower part of the housing section 15 and within the following bottom part 17. The unfiltrate chamber 49 extends upwards via the outside of the supporting plate 39 of the element seat 21 and along the outside of the filter medium 33 of the filter elements 5 to the upper housing end.

Figure 1:
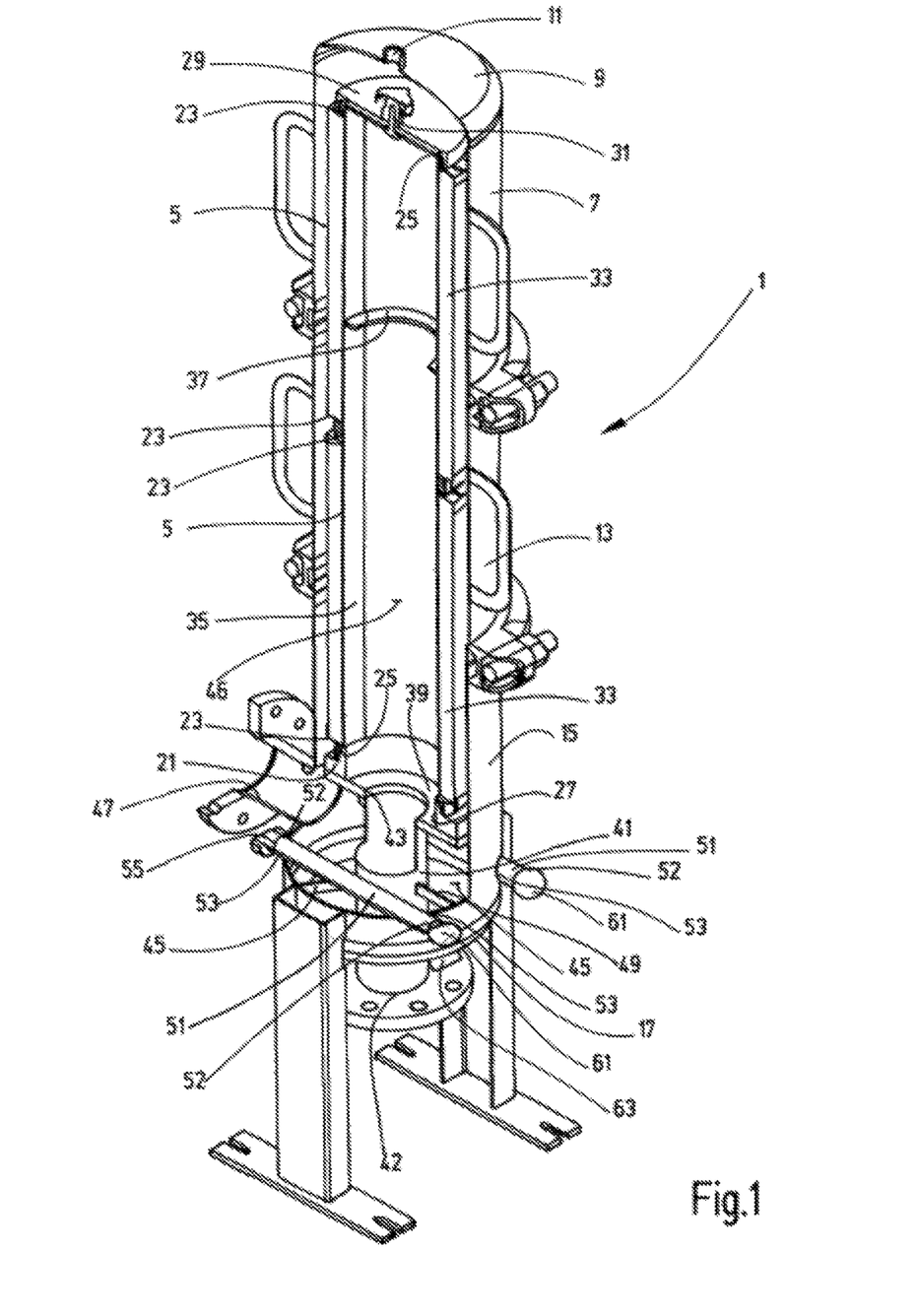
FIG. 1 is a perspective view in section of a filter device according to a first exemplary embodiment of the invention.

At the level of the lower edge of the inlet 47 and above the webs 45, the casing tubes 51 extend from one housing side wall to another housing side wall. The tubes 51 extend fully closed from the access openings 53 in the housing wall and through the entire unfiltrate chamber 49. The internal space of the tubes 51 is then separated from the unfiltrate chamber 49 impermeable to fluids. Tube ends 52 of the tubes 51 slightly protrude from the access openings 53. Each of the protruding tube ends 52 of the tubes 51 is closed by a plug 55 that is visible in FIG. 1. The opposite tube ends 52 are open. As is also depicted in FIG. 1, the tubes 51 extend parallel to each other as well as horizontally and laterally beside the pipe 41 that forms the outlet. A magnetic rod 57 may be inserted into and retrieved from each of the open tube ends 52 of pipes 51. The magnetic rods 57, also called magnetic cores, form the magnetic field generator, are made up in the usual manner of a group of consecutive permanent magnets 59 (see FIG. 4) and are provided at one end with a spherical handhold 61 to be able to easily insert and retrieve the magnetic rods 57 from the respective tube 51.

During the filtration process the casings or tubes 51 are located directly in the inflow section of unfiltrate supplied via inlet 47. Due to the magnetic force generated by the permanent magnets 59 of the magnetic rods 57, which are located inside the tubes 51, ferromagnetic particles are deposited on the outside of the tubes 51 so that pre-scalping or pre-filtering takes place within the housing section located below the filter elements 5 before the unfiltrate rises to the filter cartridge where the filtration process takes place from the outside of the filter medium 33 to the inner filter cavity 46, which forms the filtrate side. For discharging the particles that were deposited on the tubes 51, the magnetic rods 57 are pulled out of the tubes 51. Due to the resulting removal of the magnetic force, the deposited particles drop from the tube 51 to the base 19 of the bottom part 17. Besides the tube 41 that forms the discharge line for the filtrate, there is a particle outlet 63 at the base 19 of the bottom part 17, which opens outlet 63 into an open position if a discharge of particles that has accumulated on the base 19 of the bottom part 17 needs to be carried out. This discharge may simply be achieved by a flushing process in which unfiltrate, which flows in under system pressure via inlet 47, flushes the particles out through the opened outlet 63. In this instance it is preferable that the filtrate outlet 42 on tube 41 is closed so as to apply full system pressure in the flushing process. Since the tubes 51 are in the flow path of the unfiltrate coming from the inlet 47, any particles that may still adhere to the tubes 51 despite the absence of magnetic force, are carried away by the flow and discharged.

Figure 3:
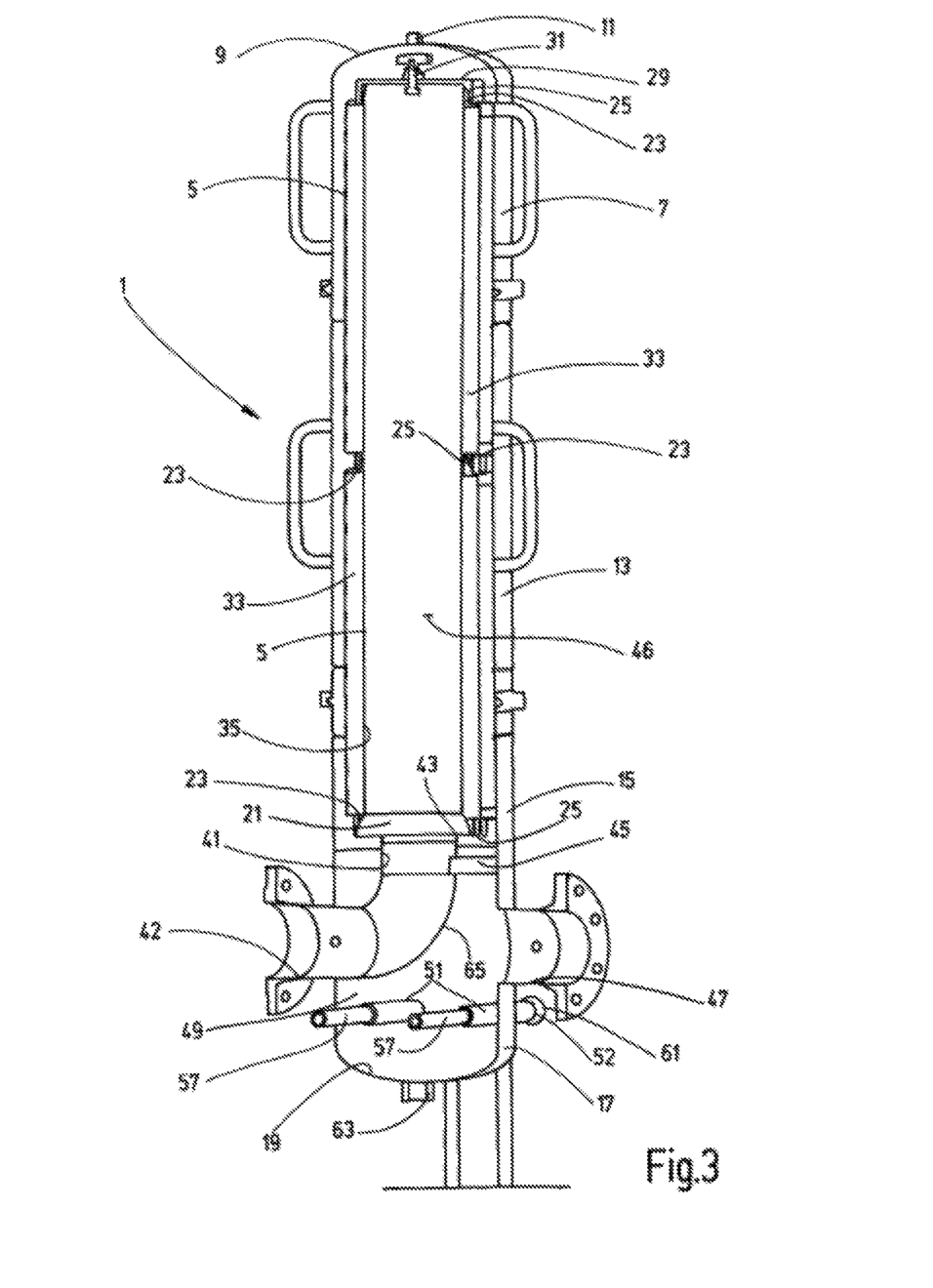
FIG. 3 is a perspective view in section of a filter device according to a second exemplary embodiment of the invention.
Figure 4:
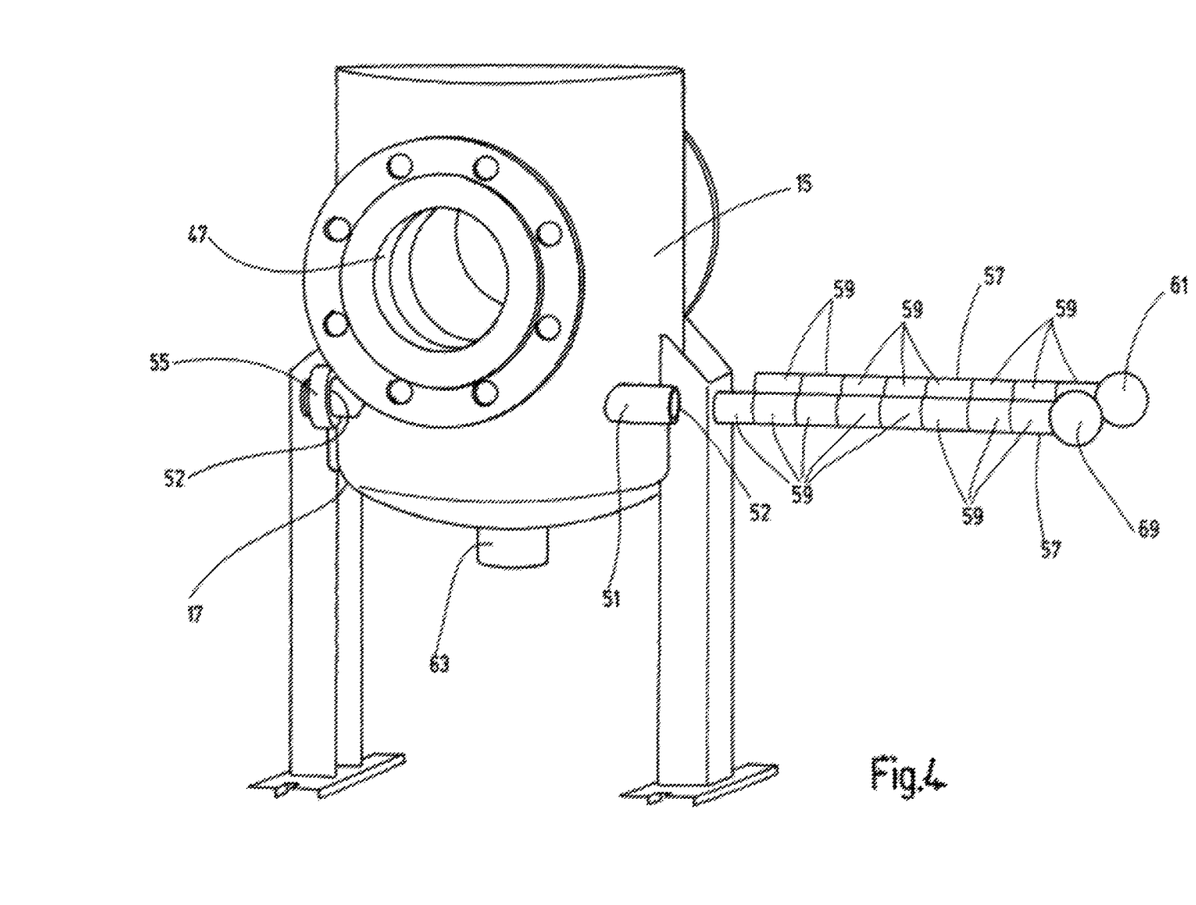
FIG. 4 is a perspective view of the housing section of the second exemplary embodiment of the filter device according to the invention, which accommodates the bottom part only, shown at a larger scale compared to FIG. 3.
Figure 5:
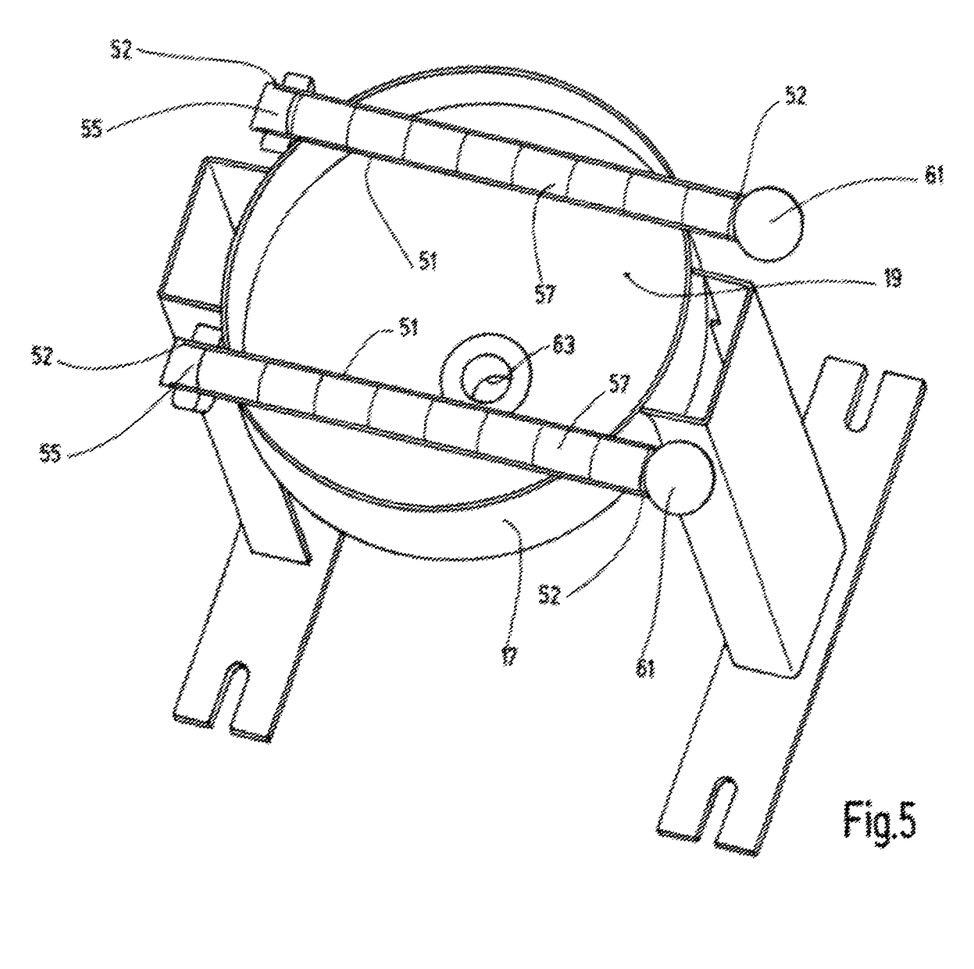
FIG. 5 is a perspective view in horizontal section of the lower part of the housing of the second exemplary embodiment, looking at the base of the bottom part.

The FIGS. 3 to 5 depict a second exemplary embodiment of the filter device according to the invention, which differs from the first described exemplary embodiment only by a modified design of the housing part below the element seat 21. Similar to the first exemplary embodiment, the element seat 21 for the filter cartridge is attached above the tube 41 that forms the outlet, which in turn, like the tube 41 in the first exemplary embodiment, is fixed via webs 45 that extend in radial direction to the side wall of the housing. In contrast to the first exemplary embodiment, the tube 41 does not extend coaxially to base 19 of bottom part 17, but is angled via an elbow 65 towards the filtrate outlet 42 by forming part of the same. The filtrate outlet 42 is disposed on the side wall of the housing in the section between the element seat 21 and the tubes 51.

Located on the side opposite to outlet 42 is the unfiltrate inlet 47 which, compared to the filtrate outlet 42 is arranged slightly below it. With the filtrate outlet 42 in a lateral position, the central section of the base 19 of the bottom part 17 is free for the coaxially arranged particle outlet 63. The tubes 51, which form the casings for the magnetic rods 57, are disposed slightly below the unfiltrate inlet 47 in the same way as in the first exemplary embodiment at a distance from each other, extending parallel and horizontal (see FIG. 5).

The functionality of the second exemplary embodiment corresponds in this design with the first exemplary embodiment, that is, the discharge of particles accumulated on tubes 51 may take place through flushing them out via the particle outlet 63 with the magnetic rods 57 removed. In both exemplary embodiments the tubes 51, which serve as casings for the magnetic rods 57, are closed by plugs 55 at one tube end 52 at the same housing side. The plugs 55 may be omitted so that magnetic rods 57 may be inserted or removed from any of the housing sides, whichever is better accessible in the installation. Also, one tube 51 may be closed on one housing side and the other tube 51 is closed on the other housing side. A different number of tubes 51 may be provided as casings for a corresponding number of magnetic rods 57.

While various embodiments have been chosen to illustrate the invention, it will be understood by those skilled in the art that various changes and modifications can be made therein without departing from the scope of the invention as defined in the claims.

The invention claimed is:
1. A device for fluids, comprising:
a filter housing having an inlet connected in fluid communication with a unfiltrate chamber in said filter housing for supplying fluid to be cleaned into said unfiltrate chamber in said filter housing, and having a filtrate outlet;
a filter element accommodated in said filter housing and having a filter medium separating said unfiltrate chamber from a filtrate chamber by said filter medium, said filtrate chamber being connected in fluid communication with said filtrate outlet for filtrate;
a first magnetic field generator being disposed within said unfiltrate chamber; and
a first casing having a first adhering surface for ferromagnetic particles deposited thereon by a magnetic force of said first magnetic field generator surrounding said first magnet field generator and extending from a first opening in a housing wall of said filter housing and into said unfiltrate chamber, said first magnetic field generator being removeably accommodated in said first casing allowing said first magnetic field generator to be inserted and at least partially retracted from said first casing, said first casing extending outside said filter element and inside said unfiltrate chamber and extending parallel to said inlet and transverse to said filtrate outlet, said unfiltrate chamber enclosing at least partially said filtrate outlet at a transition point to said filtrate chamber.

2. A filter device according to claim 1 wherein
said filter housing is capable of extending along a vertical axis in operation and comprises upper and lower housing sections, said lower housing section having said inlet, said outlet, said magnetic field generator and said first casing, said upper housing section accommodating said filter element.

3. A filter device according to claim 1 wherein
a bottom of said lower housing section is closed and has an openable and closable particle outlet, said particle outlet being openable when said filtrate outlet is closed allowing unfiltrate fluid flowing in via said inlet to flush the ferromagnet particles collected on said first casing by said first magnetic field generator from said filter housing.

4. A filter device according to claim 1 wherein
a second magnetic field generator is removably mounted in a second casing extending from a second opening in said housing wall and into said unfiltrate chamber outside of said filter element, said first and second casings extending parallel to one another on opposite sides of said filtrate outlet.

5. A filter device according to claim 4 wherein
said first and second casings extend fully through a lower section of said filter housing.

6. A filter device according to claim 1 wherein
said first magnetic field generator comprises a magnetic rod being formed of a group of permanent magnets and being accessible at said first opening for handling of said magnetic rod.

7. A filter device according to claim 1 wherein
a second casing extends from a second opening in said housing wall and into said unfiltrate chamber outside of said filter element for a receiving magnetic rod.

8. A filter element according to claim 2 wherein
said lower housing section comprises a bottom part forming a bottom end closure of said filter housing and of said unfiltrate chamber extending outside of said filter medium of said filter element, said filter element extending upwardly and being disposed at an axial distance from said bottom end closure; and
said first casing is tubular and extends in a horizontal direction through a part of said unfiltrate chamber between said bottom end closure and said filter element.

9. A filter device according to claim 8 wherein
an element seat establishes the axial distance of said filter element from said bottom end closure;
a fluid connection is between and provides fluid communication between an inner hollow space of said filter element forming said filtrate chamber and outlet line for filtrate as part of said filtrate outlet;
a second casing extends from a second opening in said housing wall and into said unfiltrate chamber outside of said filter element and receives a magnetic rod; and
each of said first and second casings extends through said unfiltrate chamber of the respective sides of said outlet line at a distance from said bottom end closure.

10. A filter device according to claim 9 wherein
said outlet line extends coaxially to said vertical axis from said element seat to said filtrate outlet located at said bottom end closure; and
a particle outlet is on said bottom end closure for ferromagnetic particle dropped from said first and second casings.

11. A filter device according to claim 9 wherein
said outlet line extends from said element seat to said filtrate outlet located in a side wall of said filter housing; and
a particle outlet is in said bottom end closure for ferromagnetic particles dropped from said first and second casings.

12. A filter device according to claim 4 wherein
said first and second casings are tubular and extend from one housing sidewall to another housing sidewall.

13. A filter device according to claim 12 wherein
each of said first and second casings has closed end at one end thereof with an opposite end thereof providing access to the respective magnetic field generator, said first and second magnetic field generators being movable magnet rods.

14. A filter device according to claim 13 wherein
said magnetic rods extend up to said closed ends in said first and second casings and have handholds extending out of said first and second openings.

* * * * *